Dec. 29, 1953
C. E. MAGNUS
2,664,137
MACHINE FOR APPLYING PROTECTIVE SPOTS
TO THE PADS OF CROWN CAPS
Filed Aug. 11, 1950
5 Sheets-Sheet 4
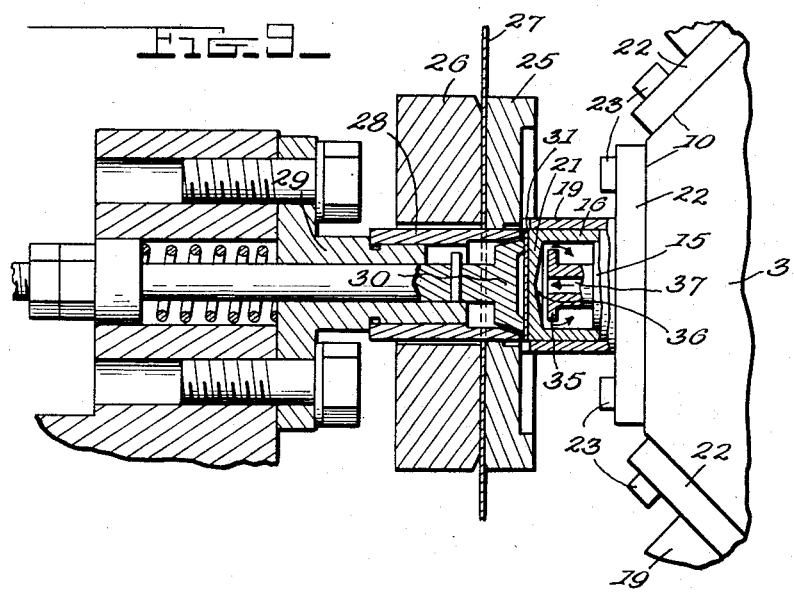
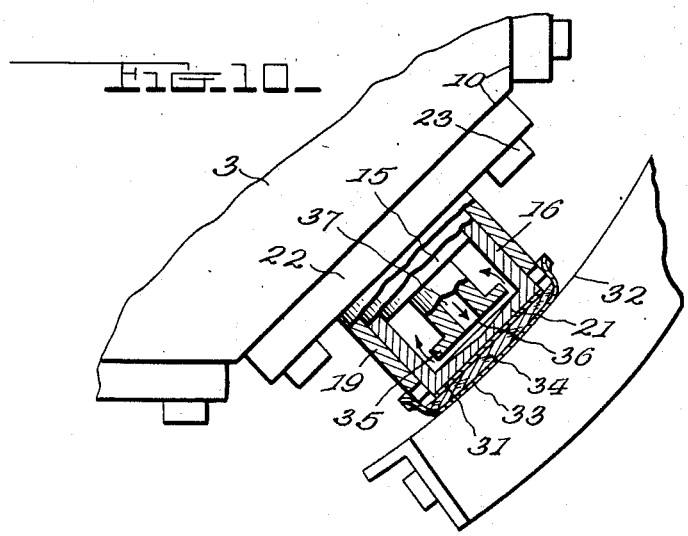
INVENTOR.
Carl E. Magnus
BY
Mason, Porter, Diller & Stewart
Attys Dec. 29, 1953     C. E. MAGNUS     2,664,137
MACHINE FOR APPLYING PROTECTIVE SPOTS
TO THE PADS OF CROWN CAPS
Filed Aug. 11, 1950     5 Sheets-Sheet 5
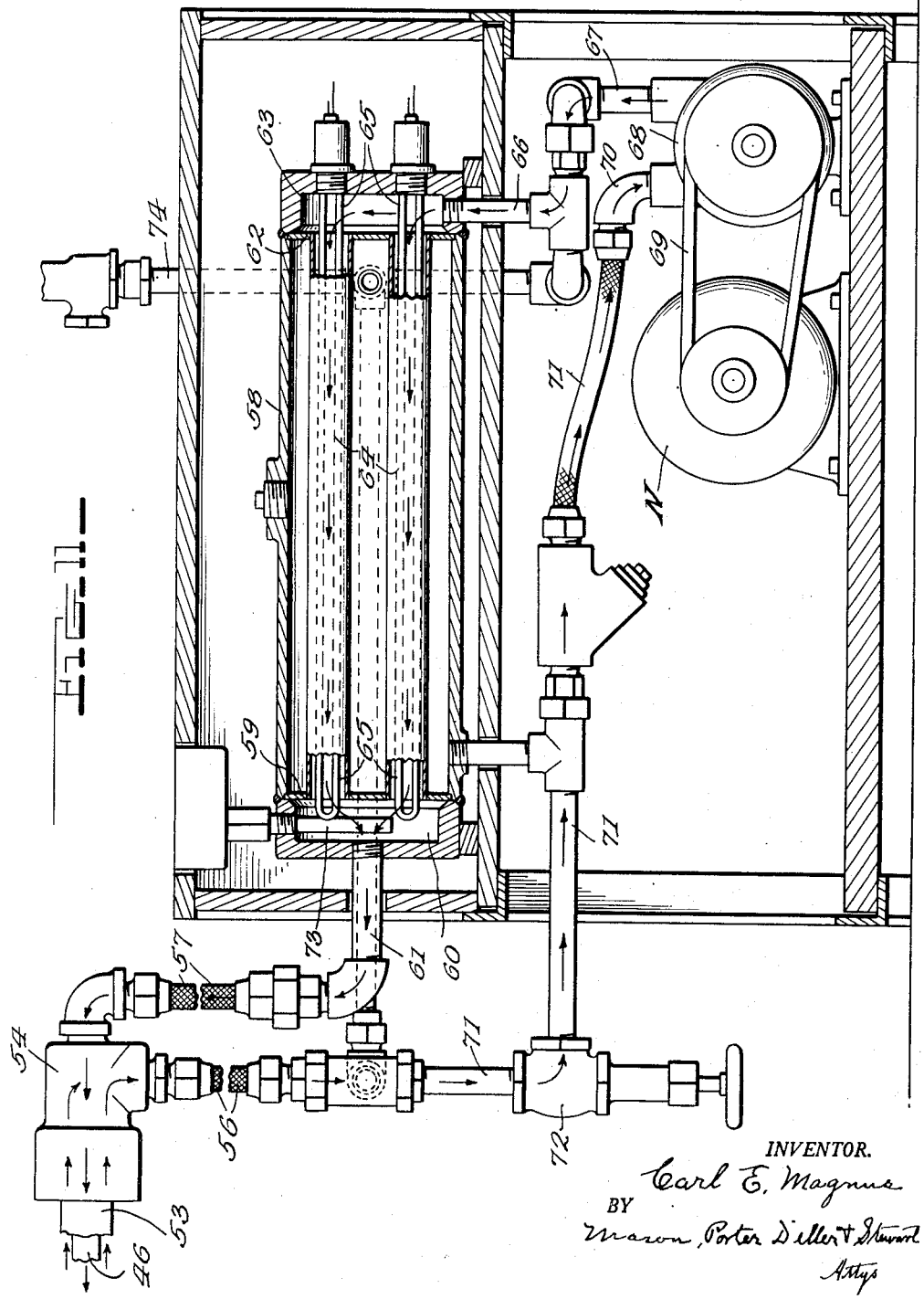
INVENTOR.
Carl E. Magnus
BY
Mason, Porter, Diller & Stewart
Attys Patented Dec. 29, 1953

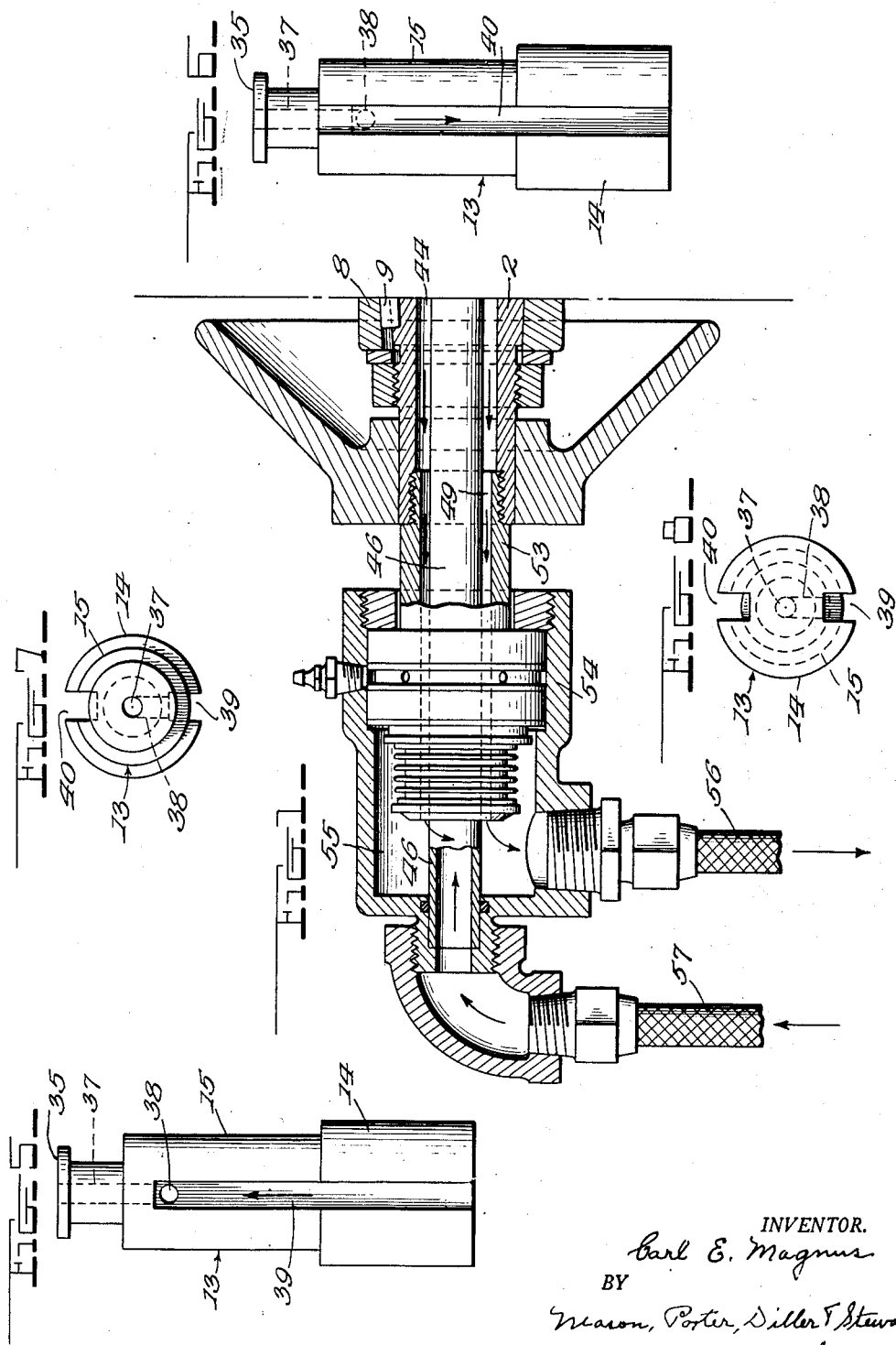

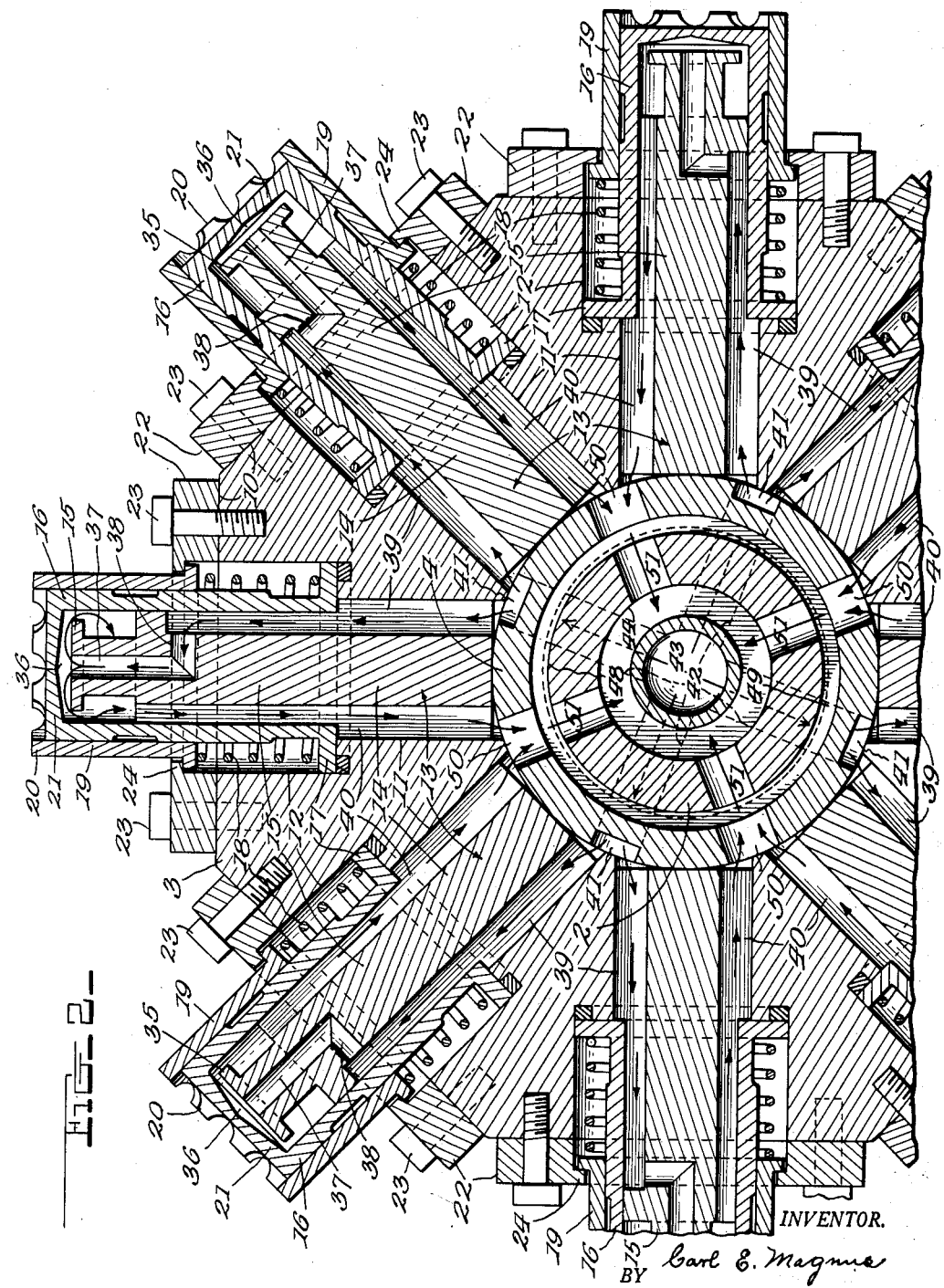

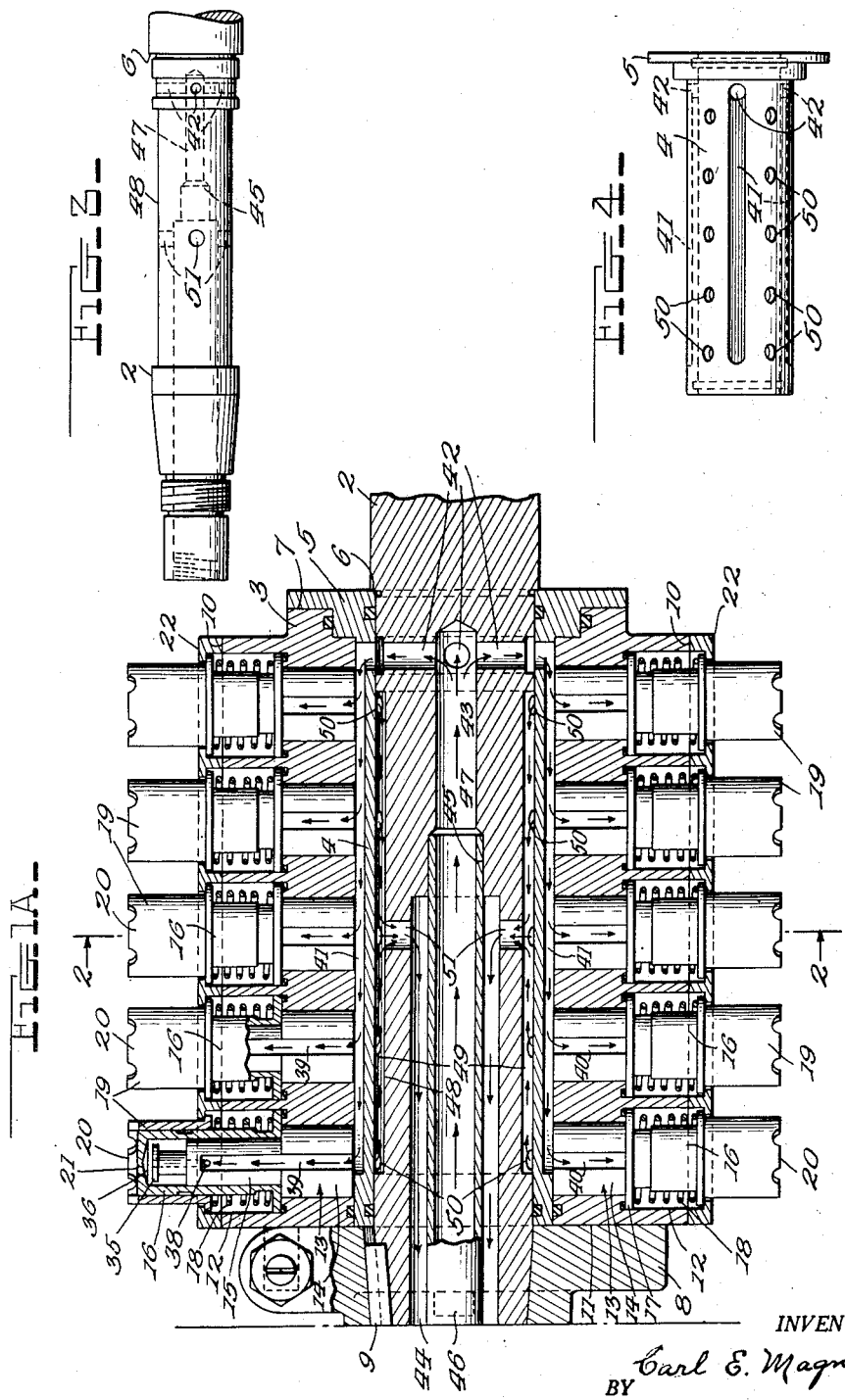

2,664,137

UNITED STATES PATENT OFFICE 2,664,137

MACHINE FOR APPLYING PROTECTIVE SPOTS TO THE PADS OF CROWN CAPS

Carl E. Magnus, Chicago, Ill., assignor to Continental Can Company, Inc., New York, N. Y., a corporation of New York Application August 11, 1950, Serial No. 178,909

6 Claims. (Cl. 154—1.5)

The invention relates to new and useful improvements in a machine for applying a protective spot to the pad of a crown cap and more particularly a machine of the type disclosed in the patent granted Paul E. Pearson February 2, 1943, No. 2,309,667.

In this machine of the patent, the spots are cut from a strip having on one face thereof an adhesive material which can be rendered tacky by heating. The spot, as it is cut from the strip is placed on a carrier, which conveys the same to an assembling station where it is applied to the pad of the crown cap. The carried spot on its way to the assembling station is presented to a stationary gas heating unit which directs heat against the adhesive face of the spot for rendering the adhesive tacky. There are some difficulties arising from the type of heating unit employed which the present invention seeks to overcome. One of these is the fact that the heating unit is spaced away from the assembling station and the adhesive, after having been rendered tacky, is likely to cool somewhat before reaching the assembling station, which requires great nicety in the regulation of the heat and also in the selection of the adhesive used in order to obtain an efficient bonding of the spot to the pad at the assembling station. Another objection is that the heating unit has to be moved away from its heating position when the machine is stopped to prevent the burning and destroying of the adhesive.

An object of the present invention is to provide a heating means for rendering the adhesive tacky which heating means transmits heat to the adhesive on the spot from the time it is received on the carrier at the punching station until the spot is applied to the pad at the assembling station.

A further object of the invention is to provide a heating means for a machine of the above type wherein a heated liquid is caused to circulate through each carrier and in contact with the head thereof carrying the spot for rendering the adhesive on the spot tacky.

A further object of the invention is to provide a liquid heating system for a spotting machine wherein the liquid used is fluid at temperatures ranging from room temperature to 495° F. or above, so that adhesives may be employed having a softening point of from 150° F. to 450° F.

These and other objects will in part be obvious and will in part be hereinafter more fully disclosed.

In the drawings, which show by way of illustration the essential parts of a machine for applying a protective spot to the pad of the crown cap:

Figure 1 is a vertical sectional view through a portion of the shaft and the coupling attached thereto for directing fluid into and from the shaft which is hollow;

Figure 1a is a vertical sectional view through a section of the main supporting shaft and the turret carried thereby, the view being a continuation of the view shown in Figure 1;

Figure 2 is a transverse vertical section of the shaft and turret on the line 2—2 of Figure 1a;

Figure 3 is a view on a smaller scale of the shaft supporting the turret;

Figure 4 is a view on a smaller scale of the sleeve mounted on the shaft between the shaft and turret block;

Figure 5 is a side view of the inner section of one of the carriers showing the groove in the side thereof and the passage leading therefrom through which a heating liquid passes to the hollow head of the carrier;

Figure 6 is a view similar to Figure 5 of the carrier from the opposite side thereof and showing the groove and passages for the return of the heating liquid;

Figure 7 is a top plan view of the inner section of the carrier shown in Figure 5;

Figure 8 is a bottom plan view of the section of the carrier;

Figure 9 is a vertical sectional view through the punch and die and also the head of the carrier showing the punch as having cut a spot from a strip of spotting material and placed the same in the carrier head;

Figure 10 is a view showing the carrier head in section with the crown cap assembled on the carrier with the spot pressed tightly against the pad of the crown cap;

Figure 11 is a vertical sectional view through the heating and circulating devices for the heating liquid and the piping leading to and from the coupling at the end of the shaft shown in Figure 1.

The invention has to do with a spot applying machine wherein a liquid heating means is used for rendering the adhesive on the spot tacky and for maintaining the adhesive in tacky condition until it is placed in contact with the pad of a crown cap.

In the drawing there is illustrated the essential features of a machine of the type disclosed in the Pearson patent, supra, for carrying out the invention. The machine includes a main rotating shaft 2 which is intermittently rotated by any suitable mechanism. Mounted on this shaft for rotation therewith is a turret block 3. A sleeve 4 is slipped onto the shaft by an endwise movement until the flange 5 of the sleeve contacts a shoulder 6 formed in the shaft. The turret block 3 is slid onto the sleeve until it is brought into contact with the flange 5 at 7. After these parts have been assembled on the shaft the collar 8 is placed against the end of the sleeve and clamps the block against the flange of the sleeve and the sleeve against the shoulder on the shaft. This collar 8 is secured to the shaft by means of a key 9 so that the shaft, the sleeve and the block all rotate as one.

Mounted on the turret block are eight rows of carriers and in each row are five carriers. These carriers are all similarly constructed, and the description of one will answer for the others. The turret block 3 has a flat face 10 for each row of carriers. The block is bored as indicated at 11 for each carrier. It is also counterbored as indicated at 12. The inner section 13 of the carrier has a base portion 14 fitting the bore 11 and a section 15 immediately above this base portion which is of slightly less diameter. Slipped on this section 15 is a sleeve 16. This sleeve 16 is provided with a flange 17 at the lower end thereof. This flange fits within the counterbore 12. Surrounding the sleeve 16 is a spring 18. The spring abuts against the flange 17. Surrounding this sleeve 16 is a collar 19 which has a limited movement on the sleeve 16 so that the end thereof 20 will project above the head 21 which closes the outer end of the sleeve 16. The spring bears against a flange at the lower end of the collar 19. A flat plate 22 is secured to the turret block by means of bolts 23. This flat plate has an opening therethrough. There is a projecting ledge 24 carried by the plate which overlies the flange on the collar 19 and limits the outward movement of the collar.

Referring to Figure 9, a portion of the punching station is illustrated. There are 5 punches, one for each carrier in the row. These punches and the mechanism for operating the same are disclosed fully in the Pearson patent, supra, and form no part of the present invention except that they cut the spot from a strip of spotting material and place the cut spot on the carriers at the punching station where the cutting of the spot occurs. Briefly, this punching mechanism includes a female die 25 with which a supporting plate 26 is associated. The strip of spotting material 27 passes between the die and the plate 26. Associated with this female die 25 is a punch 28 supported by a punch carrying member 29. Disposed within the punch, which is in the form of a sleeve is a stripper head 30. When the carrier, which is rotated intermittently is brought to the punching station and is at a rest, the punch cuts a spot 31 from the strip 27 and places it against the head 21 of the carrier. The collar 19 is pressed forward at this time so that the other end of the collar or the projections thereon form a recess or pocket at the outer end of the carrier in which the spot is retained as the carrier moves away from the punching station and toward the assembling station. The punch 28 is so dimensioned that the spots when cut from the strip and forced into pocket surrounded by the projections 20 will frictionally contact the inner face of said projections and be held in said pocket. (See Figure 9.)

In Figure 10, the carrier is shown as having rotated to the assembling station where it receives a crown cap with the pad therein. It is at this station that the cap is brought into engagement with the carrier so that the cap is moved onto the carrier and the spot brought into contact with the pad. During this movement of the cap onto the carrier the collar 19 is retracted so as to permit the spot, while in contact with the head of the carrier to be pressed by the carrier into contact with the pad. This assembling of the spot on the pad of the crown cap is of the general character disclosed in the Pearson patent. The guide for supporting the cap is indicated in Figure 10 at 32, the cap at 33 and the pad at 34. In this view, the cap and carrier have moved away from the assembling station and the carrier is still pressed against the spot and the spot against the pad. It will, however, be released when the carrier is moved through a further angle of rotation. The devices for cutting of the spots from a strip of spotting material and the assembling of the spots on the pads of the crown caps are similar to those disclosed in the Pearson patent, supra. The present invention has to do with the means for heating the spot while on the carrier to render the adhesive tacky, and the means whereby this is accomplished will now be described in detail.

The spot is heated by heating the head 21 of the carrier and this is accomplished by a circulating heated liquid. The head 21 of the sleeve 16 is spaced away from the extreme outer end 35 of the inner section of the carrier. This provides a chamber 36. There is a passage 37 centrally of the inner section of the carrier which opens into this chamber 36. This passage 37 connects with a radial passage 38 and the radial passage connects with the passage 39 extending along one side of the inner section of the carrier. The heated fluid is directed outwardly through this passage 39 into the passage 37 and thus against the inner face of the head 21. This heated liquid transfers heat to the head 21 and the head 21 transfers heat to the spot and to the adhesive face of the spot for rendering it tacky. On the opposite side of the central section of the carrier is a passageway 40 and the heated liquid passes out of the chamber 36 through this passage 40. Each carrier has similar passages for the heating liquid and the spots carried thereby are heated in the manner just stated. The only difference is that the passage 39 of one carrier is adjacent the passage 39 of the carrier next to it and the passage 40 is adjacent the passage 40 of the carrier on the opposite side thereof. The reason for this is that fluid may be directed from the same source to the passages 39 of adjacent carriers and may be exhausted or returned through the same outlet.

The sleeve 4 is provided with four channels like the channel 41 in Figure 4. All of the intake passages of the eight carriers are connected to these four channels. The channels 41 are in turn connected through passages 42 which lead to the chamber 43. The shaft 2 has a bore 44 extending from its left hand end as viewed in Figures 1 and 1ᵃ to a point slightly beyond the center of the turret block. The shaft is bored to a further extent on the lesser radius as indicated at 45. A pipe 46 extends into the shaft and snugly fits the bore 45. The heated liquid is fed into this pipe 46 and a passage 47 leads from the end of the pipe to the passages 42. The heated liquid is directed into this pipe 46 and flows through the passage in each carrier into the chamber at the outer end of the carrier. The shaft 2 has a reduced diameter as indicated at 43. This reduced diameter terminates short of the radial passages 42 in the shaft. It also terminates slightly inside of the turret block 3, so that when this sleeve 4 is placed on the shaft there is a passageway 49 between the shaft and the sleeve. The sleeve 4 is provided with openings 50. There is a row of openings directly beneath the passages 40 so that the returning liquid passes through these openings 50 into the passageway 49. There are radial openings 51 through the shaft which lead to a passageway disposed between the pipe 46 and the wall of the bore 44.

From the above it will be apparent that the heated fluid passes into the turret through the pipe 46 and from the pipe it flows into the channels 41 and thence out through the passages 39 to the chamber 36. After circulating in the chamber it returns through the passage 40 to the passageway 44 and thus out of the turret.

In Figure 1 the shaft 2 is shown as projecting from the end of the turret and attached to the end of the shaft is an extension 53 to which a coupling 54 is connected. The coupling is stationary and the shaft has a rotatable connection therewith which is fluidtight. The pipe 46 extends through the coupling 54 and is mounted therein. This pipe 46 may be stationary or may rotate with the shaft. The supporting connections between the pipe 46 and the coupling 54 and also between the pipe and the shaft at the inner end of the pipe are substantially fluidtight. The passageway 49 extends through the connection of the coupling to the shaft and connects with the chamber 55. A flexible tube 56 is connected with this chamber 55 and the return liquid passes from the chamber 55 out through this tube. There is a flexible tube 57 which connects with the chamber in the pipe 46 and the heated liquid passes in through this flexible tube 57 to the chamber in the pipe 46.

A means for heating the liquid is shown in Figure 11. This heating apparatus may be of any desired type. The one illustrated specifically forms no part of the present invention. A brief description thereof may, however, be given. This heating apparatus consists of a cylinder 58 having closed ends. Disposed inwardly from the left hand end of the cylinder is a partition 59, which forms a chamber 60 and this chamber 60 is connected through pipes 61 with the flexible tube 57. There is also a partition 62 at the other end of the cylinder which provides a chamber 63. There are tubes 64, 64 extending from one partition to the other and connecting the chamber 63 with the chamber 60. Disposed in each tube is an electric heating element 65 which may be of any desired construction, this heating element extending through the chamber 63 and each tube and for a slight distance into the chamber 60. Connected to the chamber 63 is a pipe 66 which is connected through other pipes 67 to a liquid circulating pump 68. This pump is driven by a motor N through a belt connection 69. A pipe 70 is connected with the receiving end of the pump 68 and the delivery side of the pump connects with the pipe 67. The pipe 70 is connected to a series of pipes 71 to the flexible tube 56. There is a hand controlled valve 72 associated with these pipes 71. There is a thermostat 73 extending into the chamber 60 and operating through a control mechanism of the usual type for regulating the temperature to which the liquid is to be raised. The pipe 74 is connected to a pressure tank. Through the apparatus just referred to the liquid may be raised to the desired temperature for heating the selected adhesive used for bonding the spots to the pads of the crown caps.

Any suitable thermoplastic adhesive may be used for bonding the spot to the pad. It is preferred, however, to use either gutta percha or a vinyl acetate resin type which softens at an elevated temperature. This vinyl acetate resin type adhesive requires a sealing temperature of from 350° F. to 450° F. The reason for selecting a vinyl acetate resin type is that it is cheaper than gutta percha. The adhesive is coated on a carrying strip of foil or other suitable material. Adhesive of the above type is non-tacky at atmospheric temperatures and can be readily handled, the spot cut therefrom and placed on a carrier where it is heated to render the adhesive tacky.

The adhesive of this type during heating does not melt but becomes softened and tacky and has some bonding strength while it is still hot, so that the spot while pressed against the pad at the assembling station will not loosen after it is discharged from the machine. As the heated spot cools the strength of the bond increases.

Water is not a satisfactory liquid for use as a heat transferring medium in the above-described system as its boiling temperature is way below the temperature required to render the adhesives mentioned tacky and the high pressure necessary to superheat the steam to a usable temperature is very objectionable. A liquid should be used which is fluid at temperatures ranging from room temperature to slightly above that required for rendering the adhesive selected tacky. There are a number of the liquid compositions that could be used with the adhesives mentioned. A liquid that has proven very satisfactory for this purpose is a composition consisting of 73.5% diphenyl-oxide and 26.5% diphenyl (relatively pure) referred to commercially as "Dowtherm A." The boiling point of "Dowtherm A" is 495.8° F. and, therefore, the liquid, when heated to a temperature sufficient to soften the adhesive referred to, is in fluid condition and can be circulated through the carriers, and returned for reheating at a relatively low pressure of from 2 lbs. to 5 lbs.

It will be noted that the head of each carrier will be continuously subjected to the heat of the circulating liquid throughout the entire rotation of the carriers. The head is hot when the spot is placed against the outer face of the head and remains hot, continuously transferring heat to the spot and the adhesive thereon while carriers are traveling from the punching station to the assembling station. The heating medium should be raised to a temperature sufficient to render the adhesive on the spot tacky when pressed against the pad. During the travel of the spot to the spot-applying station the adhesive is exposed to contact with the air and while it is being heated it may not be rendered tacky until it is pressed against the pad when the heat transfer is at its maximum.

Other forms of heat transferring mediums may be used but it is essential that the medium selected shall be capable of free circulation at a relatively low pressure and of being heated to a temperature sufficient to render the adhesive selected tacky when pressed against the pad.

While the heating of the carriers by the circulating of a high boiling point liquid through the carriers has been described as used in connection with a rotating spotting machine of the type disclosed in the Pearson patent, supra, it is understood that it may be used in other types of machines without departing from the spirit of the invention as set forth in the appended claims.

I claim:

1. A spotting machine comprising a spot forming device, a carrier having a head and means cooperating therewith for forming a retaining pocket for receiving the formed spot and applying the spot to the sealing pad of a cap, said carrier having a chamber within the head and passages leading to and from said chamber, means for continuously circulating a heating liquid through the passages into and out of said chamber for transferring heat to the head and the spot carried thereby, and means for heating the liquid to a temperature sufficient to render adhesive carried by the spot tacky when pressed against the pad.

2. A spotting machine comprising a punch and die for cutting the spot from a strip having a heat sensitive adhesive coating on one face thereof, a carrier having a head and means cooperating therewith for forming a retaining pocket for receiving the spot when cut from the strip, means for moving the carrier to an assembling station for applying the spot to a sealing pad of a cap, said carrier having a chamber within the head and passages leading to and from the chamber, means for continuously circulating a heated liquid through the passages into and out of the chamber for transferring heat to the head and to the spot carried thereby, and means for heating said liquid to a temperature sufficient to render adhesive carried by the spot tacky when pressed against the pad.

3. A spotting machine comprising a punching station, an assembling station, a carrier having a head and means cooperating therewith for forming a retaining pocket for receiving a spot at the punching station and applying the spot to the pad at the assembling station, said carrier having a chamber and passages leading to and from said chamber, said spot receiving head forming a wall of said chamber, means for continuously circulating a heated medium through the passages into and out of the chamber for transferring heat to the head and the spot while in contact therewith, and heating means for raising the heating medium to a temperature sufficient to render adhesive carried by the spot tacky when pressed against the pad.

4. A spotting machine comprising a punching station, an assembling station, a carrier having a head and means cooperating therewith for forming a retaining pocket for receiving a spot at the punching station and applying the spot to the pad at the assembling station, said carrier having a chamber and passages leading to and from said chamber, said spot receiving head forming a wall of said chamber, means for continuously circulating a heated liquid through the passages into and out of said chamber for transferring heat to the head and to the spot while in contact therewith, and means for heating said liquid to a temperature sufficient to render adhesive carried by the spot tacky when pressed against the pad, said heated liquid remaining in liquid form at said temperature.

5. A spotting machine comprising a shaft, a turret block mounted on said shaft, a plurality of rows of independent carriers extending longitudinally of the shaft, a spot forming station including a plurality of punches, one for each carrier in a row and operating to cut spots and place the same on said carriers, an assembling station where each spot is placed on a pad of a cap, each carrier having a head and means cooperating with said head for forming a retaining pocket in which the spot is placed, a chamber at the outer end of the carrier and passages leading to and from said chamber, said head forming one wall of said chamber, a passage connected to all of the passages leading to the chamber, and another passage connected to all of the passages leading from said chamber, and means for circulating a heated liquid through the passages to and from the chamber and means for continuously heating said liquid to a temperature sufficient to render adhesive carried by the spot tacky when pressed against the pad.

6. A spotting machine comprising a rotatable turret having a plurality of carriers, each carrier including a central section, an outer sleeve section having a spot carrying head closing the outer end of said sleeve, said sleeve and inner section when assembled forming a liquidtight chamber, the spot carrying head on the sleeve constituting a wall of said chamber, passages leading to and from said chamber, means for continuously circulating a heated liquid through the passages and into and out of the chamber for transferring heat to the head and the spot while in contact therewith, said heating liquid remaining in liquid form at a temperature sufficient to render adhesive carried by the spot tacky when pressed against the pad.

CARL E. MAGNUS.

References Cited in the file of this patent

UNITED STATES PATENTS

| Number | Name | Date |
|---|---|---|
| 2,171,258 | Pearson | Aug. 29, 1939 |
| 2,309,667 | Pearson | Feb. 2, 1943 |
| 2,310,619 | Dillehay | Feb. 9, 1943 |
| 2,479,959 | O'Neil | Aug. 23, 1949 |
| 2,593,439 | Gora | Apr. 22, 1952 |